United States Patent [19]

Yabuta et al.

[11] Patent Number: 5,173,533
[45] Date of Patent: Dec. 22, 1992

[54] DISPERSION OF REACTIVE POLYMER PARTICLES

[75] Inventors: Motoshi Yabuta; Yasushi Hiramatsu; Chikara Kawamura, all of Hiratsuka, Japan

[73] Assignee: Kansai Paint Co., Ltd., Hyogo, Japan

[21] Appl. No.: 235,573

[22] Filed: Jul. 26, 1988

[30] Foreign Application Priority Data

Jul. 28, 1987 [JP] Japan .................................. 62-186737

[51] Int. Cl.$^5$ ............................ C08J 3/09; C08J 3/11; C08F 6/24
[52] U.S. Cl. ...................................... 524/523; 525/252
[58] Field of Search ........................ 525/252; 524/523

[56] References Cited

U.S. PATENT DOCUMENTS 3,382,297  5/1968  Thompson ........................... 525/252
3,433,753  3/1969  Farkas et al. ....................... 524/523

*Primary Examiner*—Paul R. Michl
*Assistant Examiner*—LaVonda DeWitt
*Attorney, Agent, or Firm*—Wenderoth, Lind & Ponack

[57] ABSTRACT

A dispersion of reactive polymer particles obtained by polymerization of monomer in an organic liquid which dissolves the monomer but does not dissolve a polymer formed from the monomer, in the presence of a dispersion stabilizer composed of a high molecular weight polymer; characterized in that (i) said dispersion stabilizer is a high molecular weight polymer which is obtained by polymerization of an ethylenically unsaturated monomer and soluble in the above organic liquid and which contains a chemically reactive group (A); that (ii) said polymer particles are particles of a high molecular weight polymer which are obtained by polymerization of an ethylenically unsaturated monomer and contain a complementary chemically reactive group (B) capable of mutually reacting with the chemically reactive group (A); and that (iii) the chemically reactive group (A) and the chemically reactive group (B) are present stably in the dispersion. This dispersion is useful in coating compositions such as an adhesive, coating, etc.

14 Claims, No Drawings

DISPERSION OF REACTIVE POLYMER PARTICLES

This invention relates to a dispersion of reactive polymer particles curable by crosslinking, and more specifically, it relates to a one-pack type dispersion of reactive polymer particles useful in coating compositions such as an adhesive, coating, etc.

There have hitherto been many proposals with regard to processes for the production of dispersions of polymer particles formed by adsorption or grafting of a high molecular weight dispersion stabilizer in an organic liquid and stabilized with steric repulsion, i.e., so-called nonaqueous dispersion (NAD). For example, (1) U.S. Pat. Nos. 3,433,753 and 3,382,297 disclose processes for the production of polymer dispersions which comprise a first step of copolymerizing an ethylenically unsaturated monomer and a first ethylenically unsaturated comonomer containing a reactive group in the presence of a dispersion stabilizer composed of block or graft copolymer and a second step of adding, for copolymerization therewith, an ethylenically unsaturated monomer and a second ethylenically unsaturated monomer containing a complementary reactive group capable of reacting with the reactive group contained in the first ethylenically unsaturated comonomer. (2) U.S. Pat. No. 3,365,414 describes a process for the production of a polymer dispersion in which the process uses alkylated melamine resin as a dispersion stabilizer, and a hydroxyl group and carboxyl group are contained in the dispersed polymer particles. And (3) Japanese Patent Publication No. 5657/1976 describes a thermosetting polymer dispersion comprising a vinyl(acryl)-polymer (A) dispersion and a vinyl(acryl) polymer (B) dispersion, in which the polymers (A) and (B) are obtained by copolymerization in the presence of fatty acid-modified alkyd resin, epoxy resin or urethane resin as a dispersion stabilizer, and the chemically reactive group of the polymer (B) is a complementary group capable of undergoing a crosslinking reaction with the chemically reactive group of the polymer (A).

However, in the polymer dispersions described in U.S. Pat. Nos. 3,433,753 and 3,382,297, crosslinkage gradually occurs within the polymer particles during the storage, and their compatibility with a dispersion stabilizing component becomes poor. Thus, these polymer dispersions have defects of causing phase separation, giving easily rise to loss of gloss when they are formed into coatings, etc. On the other hand, the polymer dispersion described in U.S. Pat. No. 3,365,414 has defects that if melamine resin as a dispersion stabilizer is not highly alkylated, gelation easily takes place at the time of the polymerization reaction, that highly alkylated melamine has poor reactivity, and that a coating formed therefrom is poor in solvent resistance. Further, the polymer dispersion described in Japanese Patent Publication No. 5675/1976 have problems that the compatibility between its dispersion stabilizer and polymer particles is not sufficient, thus causing phase separation during the storage, loss of gloss at the time of coating formation after the storage, deterioration of solvent resistance, etc.

This invention relates to a novel dispersion of reactive polymer particles which overcomes the aforementioned defects, and it is to provide a dispersion of reactive polymer particles which is excellent in stability during a reaction to form polymer particles, storage stability of a dispersion of the formed polymer particles, etc., and which has good compatibility and excellent crosslinking property.

The present inventors have found that in a dispersion of polymer particles stabilized by steric repulsion formed by a high molecular weight dispersion stabilizer, a dispersion which has good compatibility and excellent crosslinking property and further which is unexpectedly excellent in storage stability can be obtained by allowing two or more reactive groups, which are by nature likely to undergo a complete reaction when they are mixed, to be present sterically or physically separately in a high molecular weight dispersion stabilizer and a dispersion polymer molecules, respectively. This finding has led to this invention.

According to this invention, therefore, there is provided a dispersion of reactive polymer particles obtained by polymerization of monomer in an organic liquid which dissolves the monomer but does not dissolve a polymer formed from the monomer, in the presence of a dispersion stabilizer composed of a high molecular weight polymer, characterized in that (i) said dispersion stabilizer is a high molecular weight polymer which is obtained by polymerization of an ethylenically unsaturated monomer and soluble in the above organic liquid and contains a chemically reactive group (A); that (ii) said polymer particles are particles of a high molecular weight polymer which are obtained by polymerization of an ethylenically unsaturated monomer and contain a complementary chemically reactive group (B) capable of mutually reacting with the chemically reactive group (A); and that (iii) the chemically reactive group (A) and the chemically reactive group (B) are present stably in the dispersion.

In this invention, the dispersion stabilizer composed of a high molecular weight polymer should be of a less excessively high molecular weight and polarity so that it exhibits a dispersion-stabilizing function when it is dissolved in an organic liquid. That is because dissolution of an excessively high molecular weight or highly polar dispersion stabilizer resin requires the use of a polar solvent having high dissolving power such as ester, ketone, alcohol, etc., by mixing it in a relatively large proportion. As a result, the polymer-forming monomer which forms dispersed polymer particles has to be a monomer of high polarity for that use. Otherwise, seed particles which are being formed at the time of forming polymer particles tend to swell, the functional group in the dispersion stabilizer and the functional group in the polymer particles become indiscrete, and the entire system causes gelation. Hence, the result is that freedom of selection of the monomer is limited.

In the dispersion polymerization reaction, it has not yet been clearly understood why the functional group (e.g., —OH group) in the dispersion stabilizer and the functional group (e.g., —NCO group) in the polymer particles do not substantially react, i.e., do not cause gelation at a temperature for the particle formation reaction (e.g., 50° to 150° C.). As mentioned above, however, the reaction system causes gelation during the particle formation if the particle formation speed is decreased by increasing the polarity of a solvent used in the reaction system to increase its dissolving power or selecting a monomer having low polarity as a polymer to form the particles. Therefore, it is surmised that a particle-forming monomer begins polymerization and forms particles at a higher speed than the reaction speed of the above two functional groups, and that the functional group in the particle-forming monomer is taken into the particle at a speed at which it does not start to react with the functional group in the dispersion stabilizer.

The following is an explanation of particle formation of the particle-forming monomer.

The method of forming particles in an organic liquid which dissolves a dispersion stabilizer and a particle-forming monomer but does not dissolve a high molecular weight-formed polymer (including oligomer), in the presence of a dispersion stabilizer, includes the following two modes as large classes.

The one mode is that the particle-forming monomer increases its degree of polymerization in the order of dimer, trimer, . . . oligomer, . . . and polymer to make itself insoluble in an organic solvent, and the oligomer or polymer molecules mutually coagulate to form particles.

The other mode is that particle-forming monomers are absorbed into a formed particle and the particle-forming monomers form a polymer inside the particle.

In general, since a monomer to form a polymer by polymerization is a good solvent and since the migration speed of a monomer into the formed polymer particle and the proportion of migrated monomers are high, the latter particle formation and growth is considered main after the particle is formed once.

As mentioned previously, the point of the polymer particle formation in this invention is how to make the particle formation speed faster than the reaction speed of the two functional groups, to form stable polymer particles. The factor to control the above point is nonsolubility (nonswellability) of the organic liquid to the polymer particles and oligomer, and the above point is affected by dissolving power of the organic liquid and polarity of the particle-forming monomer.

For reasons mentioned above, it is preferable to use an organic liquid having a low dissolving power in this invention. Examples of said organic liquid include aliphatic, aromatic or mineral oil-type hydrocarbons having comparatively low dissolving power, such as VM & P naphtha, mineral spirit, solvent kerosine, aromatic naphtha, solvent naphtha, etc.; aliphatic hydrocarbons such as n-butane, n-hexane, n-heptane, n-octane, isononone, n-decane, n-dodecane, etc.; and alicyclic hydrocarbons such as cyclopentane, cyclohexane, cycloheptane, etc. A small amount of a polar solvent of ester-type, ether-type, ketone-type, alcohol-type, etc., may be used in combination as required.

Among these orgnaic solvents, n-hexane, n-pentane, cyclohexane, etc., are preferably used.

The composition of the organic liquid in this invention becomes unsuitable as it approaches to a point where the organic liquid swells or dissolves the polyemr particles. However, the organic liquid has to dissolve the dispersion stabilizer. The marginal composition of the organic liquid in which the polymer particles are substantially insoluble can be estimated on the basis of solubility parameters of the organic liquid and polymer particles obtained from a method described in Journal of Paint Technology, Vol. 38, page 269 and Vol. 39, page 19. The most preferable composition of the organic liquid depends on the composition of polymer particle-forming monomer, the composition and molecular weight of dispersion stabilizer, etc., and therefore, it is very difficult to define its general ranges commonly applicable to all dispersions. However, the solubility parameters (SP value) as standard ones are in the range of not more than 9.3, preferably not more than 8.5, with regard to the organic liquid, in the range of not more than 9.3, preferably not more than 9.0, with regard to the dispersion stabilizer and in the range of not less than 9.0, preferably not less than 9.3, with regard to the polymer particles. And it is, in general, advantageous to make a SP value difference of not less than 0.2, preferably not less than 0.5, between the polymer particles and organic liquid, and a SP value difference of not less than 0.2, preferably not less than 0.5, between the polymer particles and dispersion stabilizer, in order to prevent gelation at the polymerization time.

In this invention, the resin most suitably usable as a dispersion stabilizer is a vinyl-type or acryl-type resin obtained by polymerization of ethylenically unsaturated monomer. The reasons therefor are that a reactive group such as isocyanate group, hydroxyl group, carboxyl group, epoxy group, etc., can be easily introduced into such resin, and that the composition of resin soluble in the organic liquid having low dissolving power can be selected in the large range of resin. Further, the glass transition point and molecular weight of such resin can be selected freely to a great extent. Furthermore, this vinyl-type or acryl-type resin may be a graft or block polymer.

In this invention, vinyl-type or acryl-type resin containing, on average, not less than 2, preferably 5 to 50, of chemically reactive groups (A) in one molecule thereof and a number average molecular weight in the range of, in general, from 1,000 to 50,000, preferably, from 3,000 to 20,000, may be used as a dispersion stabilizer. A resin having a number average molecular weight of less than 1,000 does not have sufficient dispersion-stabilizing ability, and a resin having a number average molecular weight of more than 50,000 comes to show difficulty in dissolving it in the organic liquid. The production of the dispersion stabilizer can be carried out by copolymerizing a nonfunctional ethylenically unsaturated monomer and an ethylenically unsaturated monomer having the chemically reactive group (A) according to an ordinary process.

In this invention, the polymer particles are, preferably, of vinyl-type or acryl-type resin obtained by polymerization of an ethylenically unsaturated monomer, and have to have the complementary chemically reactive group (B) capable of mutually reacting with the chemically reactive group (A) in the above dispersion stabilizer. Preferably, the numbers of the reactive groups (A) and (B) are nearly the same, which, however, is not essential. The numbers of the reactive groups may be different to some extent. For example, polymer particles having the reactive group (B) in an amount 0.3 to 3, preferably 0.5 to 2, times more than the amount of the chemically reactive group (A) are advantageously used. The formation of the polymer particles can be carried out by dispersion-copolymerizing a nonfunctional ethylenically unsaturated monomer and an ethylenically unsaturated monomer having the chemically reactive group (B) in the above organic liquid in the presence of the above dispersion stabizer.

The following Table 1 shows typical combinations of the chemically reactive group (A) contained in the dispersion stabilizer and the complementary chemically reactive group (B) for use in formation of the above polymer particles. And the subsequent Table 2 shows specific examples of ethylenically unsaturated monomers having such reactive groups.

TABLE 1

| Chemically reactive examples of group (A) | Specific examples of acryl-type or vinyl-type monomer | Complementary reactive group (B) | Specific acryl-type or vinyl-type monomer |
|---|---|---|---|
| Hydroxyl | Table 2 (1) | Epoxy | Table 2 (4) |
| | | Anhydrous carboxylic acid | Table 2 (3) |
| | | Carboxyl | Table 2 (2) |
| | | Isocyanate | Table 2 (7) |
| | | Methylol | Table 2 (5) |
| | | Alkoxymethylol | Table 2 (6) |
| Carboxyl | Table 2 (2) | Epoxy | Table 2 (4) |
| | | Hydroxyl | Table 2 (1) |
| | | Isocyanate | Table 2 (7) |
| | | Amino | Table 2 (9) |
| | | Aldehyde | Acrolein crotonaldehyde |

| Chemically reactive group (A) | Specific examples of acryl-type or vinyl-type monomer | Complementary reactive group (B) | Specific examples of acryl-type or vinyl-type monomer |
|---|---|---|---|
| Anhydrous caboxylic acid | Table 2 (3) | Hydroxyl | Table 2 (1) |
| | | Methylol | Table 2 (5) |
| | | Epoxy | Table 2 (4) |
| | | Amino | Table 2 (9) |
| Epoxy | Table 2 (4) | Hydroxyl | Table 2 (1) |
| | | Carboxyl | Table 2 (2) |
| | | Anhydrous carboxylic acid | Table 2 (3) |
| | | Methylol | Table 2 (5) |
| | | Amino | Table 2 (9) |
| | | Chloro | Table 2 (10) |
| Methylol | Table 2 (5) | Hydroxyl | Table 2 (1) |
| | | Isocyanate | Table 2 (7) |
| | | Anhydrous carboxylic acid | Table 2 (3) |
| | | Alkoxy methylol | Table 2 (4) |
| | | Aldehyde | Acrolein crotonaldehyde |
| | | Chloro | Table 2 (10) |
| Alkoxymethlol | Table 2 (6) | Hydroxyl | Table 2 (1) |
| | | Methylol | Table 2 (5) |
| Isocyanate | Table 2 (7) | Hydroxyl | Table 2 (1) |
| | | Methylol | Table 2 (5) |
| Amide | Table 2 (8) | Chloro | Table 2 (10) |
| | | Aldehyde | Acrolein crotonaldehyde |
| | | Amide | Table 2 (8) |
| Amino | Table 2 (9) | Epoxy | Table 2 (4) |
| | | Carboxyl | Table 2 (2) |
| | | Aldehyde | Acrolein crotonaldehyde |
| | | Anhydrous carboxylic acid | Table 2 (3) |
| | | Chloro | Table 2 (10) |
| Chloro | Table 2 (10) | Epoxy | Table 2 (4) |
| | | Methylol | Table 2 (5) |
| | | Amide | Table 2 (8) |
| | | Amino | Table 2 (9) |
| Alkoxysilane | Table 2 (11) | Hydroxyl | Table 2 (1) |
| | | Carboxyl | Table 2 (2) |

TABLE 2

| Functional group | Acryl-type or vinyl-type monomer |
|---|---|
| (1) Hydroxyl | Hydroxyethyl acrylate |
| | Hydroxyethyl methacrylate |
| | Hydroxypropyl acrylate |
| | Hydroxypropyl methacrylate |
| | Allyl alcohol |
| (2) Carboxyl | Acrylic acid |
| | Methacrylic acid |
| | Maleic acid |
| | Itaconic acid |
| (3) Anhydrous carboxylic acid | Anhydrous maleic acid |
| | Anhydrous itaconic acid |
| (4) Epoxy | Glycidyl acrylate |
| | Glycidyl methacrylate |
| | 3,4-Epoxycyclohexylmethyl acrylate |
| | 3,4-Epoxycyclohexylmethyl methacrylate |
| | Arylglycidyl ether |
| (5) Methylol | Methylolacrylamide |
| (6) Alkoxymethylol | Alkyl (methyl, ethyl, isopropyl, butyl, amyl) etherified product of methylolacrylamide |
| (7) Isocyanate | Cyanoacrylate |
| | 2-Isocyanateethyl methacrylate |
| | m-Isopropenyl-alpha,alpah'-dimethyl-benzylisocyanate |
| | Adduct of hydroxyl group-containing monomer with diisocyanate compound (1:1 by molar ratio) (e.g., adduct of 1 mole of hydroxyethyl methacrylate with tolylene diisocyanate) |
| (8) Amide | Acrylamide |
| | Methacrylamide |
| (9) Amino | Aminoalkyl methacrylate |
| | Aminoalkyl acrylate |
| (10) Chloro | Acrylic chloride |
| | Methacrylic chloride |
| | Vinyl chloride |
| | Vinylidene chloride |
| | Adduct of chloric acid with glycidyl acrylate and glycidyl methacrylate in epoxy group |
| (11) Alkoxysilane | gamma-Methacryloxypropyltrimethoxy-saline |

In the combinations of the chemically reactive group (A) and the complementary chemically reactive group (B) shown in the previous Table 1, preferably used are the combination of epoxy group with carboxyl group, the combination of hydroxyl group with isocyanate group and the combination of alkoxysilane group with hydroxyl group.

On the other hand, examples of the ethylenically unsaturated monomers, which are copolymerizable with the monomers having the above functional groups in order to obtain the dispersion stabilizer and the polymer particles, include aromatic vinyl-type monomers such as styrene, alpha-methyl styrene, vinyl toluene, etc.; (meth)acrylic acid esters such as methyl (meth)acrylate, ethyl (meth)acrylate, propyl (meth)acrylate, butyl (meth)acrylate, 2-ethylhexyl (meth)acrylate, lauryl (meth)acrylate, tridecyl (meth)acrylate, stearyl (meth)acrylate, cyclohexyl (meth)acrylate, benzyl (meth)acrylate, etc.; fluorine-containing vinyl-type monomers such as Biscoat 3F (manufactured by Osaka Yuki Kagaku: Biscoat 3MF (''), Biscoat 8F (''), Biscoat 8MF (''), perfluorocyclohexyl(meth)acrylate, N-2-propylperfluoro-octanesulfonamideethyl (meth)acrylate, vinyl fluoride, vinylidene fluoride, etc.; nitrogen-containing vinyl-type monomers such as N,N'-dimethylaminoethyl (meth)acrylate, N,N'-diethylaminoethyl (meth)acrylate, N,N-diethyl (meth)acrylate, etc.; vinyl ether-type monomers such as vinylethyl ether, vinylbutyl ether, etc.; lactone-modified (meth)acrylate-type monomers such as Placcel FA-1 (manufactured by Daisel Ltd.), Placcel FA-2 (''), Placcel FM-1 (''), Placcel FM-2 (''); and others such as vinyl formate, vinyl acetate, (meth)acrylonitrile, vinyl propionate, vinyl stearate; etc. These monomers are selected suitably for use depending upon the desired performance. Among the above monomers, those of low polarity are preferably used for production of the dispersion. Therefore, for example, among the (meth)acrylic acid esters, those in which the alcohol component has not less than 3 carbon atoms (propyl) are preferably used. Further, it is advantageous to select them such that the glass transition point of the dispersion stabilizer is brought into the range of, in general, from −20° C. to 60° C., preferably from −20° C. to 50° C. On the other hand, when the above monomers are used for production of the polymer particles, it is advantageous to use a larger amount of monomer having relatively high polarity and make selections from the above monomers such that the glass transition point is rendered high, in order to prevent gelation during the polymerization reaction. To give concrete examples, among the (meth)acrylic acid esters, it is preferable to use those composed of an alcohol component having not more than 4 carbon atoms (butyl). And it is more preferable that the total amount of methylmethacrylate, acrylonitrile and/or styrene forms not less than 40 % by weight of all the monomers used for formation of the polymer particles. From the viewpoint of performance and safety in the polymerization, the suitable glass transition point of the polymer particles is in the range of from 10° to 100° C., more preferably from 20° to 80° C.

In addition, with regard to the functional groups which are allowed to be present in the dispersion stabilizer and polymer particles, respectively, one or more functional groups may be present simultaneously in each of these if the functional groups do not undergo a mutual reaction. Further, a combination of functional groups which undergo a mutual reaction may be present in the dispersion stabilizer and polymer particles, if these functional groups have very low reactivity under ordinary conditions. For example, it is possible to produce the polymer particles without problem by copolymerizing isocyanateethyl methacrylate and glycidyl methacrylate as monomers having reactive groups with other ethylenically unsaturated monomers under the conditions of about 60° to 130° C. in the presence of a dispersion stabilizer obtained by copolymerizing hydroxyethyl acrylate and acrylic acid as monomers having reactive groups.

The unsaturated monomers having chemically reactive groups for use in synthesis of the dispersion stabilizer and polymer particles, respectively, may be used in amounts in the range of, in general, from 1 to 95% by weight, preferably from 5 to 60% by weight, more preferably from 10 to 40% by weight, per the total weight of monomers in each copolymerization.

By the above use, two or more, on average, of the reactive groups can be introduced into a molecule of the dispersion stabilizer. From the viewpoint of sedimentation stability and compatibility between dispersion stabilizer and polymer particles in use, it is often preferable that the dispersion stabilizer and polymer particles are grafted in advance. For example, when the dispersion stabilizer contains a hydroxyl group, carboxyl group, epoxy group, isocyanate group, etc., polymeric double bonds can be introduced to form graft active points with the polymer particles by adding about 0.5 to 1, on average, per molecule of the dispersion stabilizer, of ethylenically unsaturated monomer having groups to react with the above groups. Further, it is possible to use a grafting method by hydrogen elimination using a peroxide catalyst, and active energy ray or living polymerization method may be used for the grafting. Naturally, the dispersion stabilizer and polymer particles are not necessarily grafted. Furthermore, there is a method using a possibility that these two components are grafted to some extent by a reaction of mutually reactable functional groups introduced into the molecules of these two components. However, the grafting by this method is not positively recommendable, since it is difficult to control such grafting in view of the object of this invention.

polymerizing initiators for polymerizing ethylenically unsaturated monomer to produce the dispersion stabilizer or polymer particles are, for example, organic peroxides such as benzoyl peroxide, lauroyl peroxide, caproyl peroxide, t-butyl peroctoate, diacetyl peroxide, etc.; azo-type catalysts such as azobisisobutylonitrile, azobis alpha,gamma-dimethylvaleronitrile, dimethyl alpha,alpha'-azoisobutylate, etc.; dialkylperoxydicarbonate such as diisopropylperoxydicarbonate, etc.; and redox-type initiators.

The polymerization initiator can be used in an concentration in the range of from 0.01 to 10% by weight based on the total weight of monomers. However, its preferred range is from 0.1 to 5% by weight.

It is also possible to use electron ray or ultraviolet ray in place of the polymerization initiator. The polymerization temperature as a reaction condition during preparation of the polymer particles is, in general, about 0° C. to 150° C. Basically, however, it is preferable to carry out the reaction at as low as possible a temperature in order to allow the mutually reacting reactive groups to remain effectively and prevent risks such as gelation, etc., and the polymerization temperature of about 50° C. to about 110° C. is preferable. The reaction time is not specially limited. However, it should be as short as possible. Preferably, the reaction conditions are usually set such that the reaction for formation of the polymer particles comes to an end within 2 to 10 hours.

The dispersion stabilizer/polymer particles ratio is, in general, 5/95 to 70/30 (by weight), preferably 10/90 to 60/40, more preferably 20/80 to 50/50. Preferably, the functional groups to be contained in the molecules of the dispersion stabilizer and polymer particles are formulated such that they are nearly equimolar, depending upon the dispersion stabilizer/polymer particle ratios. However, there is no problem in presence of a little excessive amount of one of these functional groups as a result of consideration of adherence, durability, etc.

In the polymer particle dispersion obtained in this invention, said dispersion is applied onto an appropriate substrate and the organic liquid is evaporated whereby the chemically reactive group (A) in the dispersion stabilizer and the chemically reactive group (B) in the polymer particles undergo a crosslinking reaction. In order to promote the crosslinking reaction, said dispersion may contain a particle-coalescing solvent. The organic liquid to which the particle-coalescing solvent is incorporated, as a whole, neither swells nor dissolves the polymer particles. However, after evaporation of poor solvents such as aliphatic hydrocarbons, etc., in the organic liquid, the particle-coalescing solvent remains in the resin phase, and it promotes the fusion of the polymer particles by swelling, dissolving or plasticizing the polymer particles, i.e., plays a role to advance a reaction between the functional groups. Therefore, the particle-coalescing solvent is a good solvent to the dispersion stabilizer and the polymer particles, and effective are those having a boiling point equal to or higher, preferably by at least 10° C., than those of the solvents which are organic liquids in the dispersion, such as aliphatic hydrocarbon etc.

The amount of the particle-coalescing solvent in use per 100 parts by weight of dispersed resin solid content is in the range of, in general, not more than 400 parts by weight, preferably from 10 to 100 parts by weight. The use of too large an amount thereof swells the polymer particles, and the reaction proceeds in the dispersed liquid state. Thus, defects of gelation in the system, shortening of pot life, etc., are likely to be caused.

Examples of the particle-coalescing solvents include ketones such as methyl ethyl ketone, methyl isobutyl ketone, cyclohexanone, isophorone; ethers and esters such as butyl acetate, cellosolve, cellosolve acetate, carbitol acetate, methyl cellosolve acetate, butylcarbitol acetate, etc.; alcohols such as benzyl alcohol, octyl alcohol, etc.; and so-called plasticizer such as dibutylphthalate, etc., (provided that a hydroxyl group-containing solvent cannot be used in the system containing an isocyanate group).

For addition of the particle-coalescing solvent to the dispersion, there can be cited a method of preincorporating it at the time of synthesizing the polymer particles; or a method of adding it dropwise little by little with sufficient care after the end of the polymerization or incorporating it after dilution with a poor solvent.

The dispersion of this invention can be used in a coating composition, adhesive, etc. When it is used in a coating composition, it can be used not only as a clear coating but also by incorporating thereto additives such as an organic or inorganic pigment, extender pigment (filler), metal powder pigment, dye, various catalysts, deterioration preventor, etc.

This invention makes it possible to obtain a stable dispersion by physically separating the dispersion stabilizer and the polymer particles according to a difference in solubility to the organic liquid. It is not clearly understood why the functional groups of the dispersion stabilizer and monomers to form polymer particles do not react with each other at the time of the reaction to form the polymer particles. One reason surmisable is that (1) the polymerization reaction speed of the unsaturated groups is remarkably faster than that of the reaction of the functional groups, and therefore, (2) the formed polymer particles become insoluble in the organic liquid as the polymerization proceeds to increase the molecular weight, thus resulting in no contact with the functional group in the dispersion stabilizer.

In the dispersion of this invention, the dispersion stabilizer and polymer particles are all of vinyl-type or acryl-type resin, and further, they have chemically reactive groups reacting with each other to form a cross-linkage. Therefore, when the dispersion is dried, the dispersion stabilizer and the polymer particles have good compatibility and form dense bondings. As a result, it is made possible to give a coating having excellent solvent resistance, gloss, weather resistance, etc. Further, the dispersion of this invention has good storage stability and is usable as one-pack type composition.

The following are explanations of this invention according to Examples. However, this invention shall not be limited thereto.

In the following Preparation Examples, Examples and Comparative Examples, "part" stands for "part by weight".

PREPARATION EXAMPLE 1

200 parts of xylene and 200 parts of Shellsol 340 (made by Shell Oil Co.) were charged into a reactor having a stirrer, reflux condenser and thermometer, and the mixture was heated to 120° C. While this temperature was maintained, a mixture of 250 parts of 2-ethylhexyl methacrylate, 95 parts of lauryl methacrylate, 50 parts of styrene, 100 parts of hydroxyethyl acrylate, 5 parts of acrylic acid and 10 parts of azobisisobutylonitrile was added dropwise over 3 hours.

Then, 100 parts of xylene and 2.5 parts of azobisisobutylonitrile were added dropwise over 1 hour, and thereafter, the reaction product was matured at 120° C. for 1 hour.

After the maturing, 0.1 part of p-tert. butylcatechol and 20.0 parts of isocyanateethyl methacrylate were added, and the mixture was heated at 90° C. for 2 hours to give a clear varnish (dispersion stabilizer A liquid) having a Gardner viscosity of G and a solid content of 50%. The resultant resin had a number average molecular weight of about 9,000 and on the average about 1.0 polymeric unsaturated double bond per molecule.

PREPARATION EXAMPLE 2

By using 100 parts of isocyanateethyl methacrylate in place of 100 parts of hydroxyethyl methacrylate and further by using 20 parts of hydroxyethyl acrylate in place of 20 parts of isocyanateethyl methacrylate after the maturing, Preparation Example 1 was repeated to give a clear varnish (dispersion stabilizer B) liquid) having a solid content of 50% and a Gardner viscosity of F. The resultant resin had a number average molecular weight of about 9,000 and on the average about 1.0 polymeric unsaturated double bond per molecule.

PREPARATION EXAMPLE 3

200 parts of xylene and 200 parts of Shellsol (made by Shell Oil Co. were charged into the same reactor that was used in Preparation Example 1, and the mixture was heated to 120° C. While this temperature was maintained, a mixutre of 250 parts of 2-ethylhexyl methacrylate, 95 parts of lauryl methacrylate, 50 parts of styrene, 100 parts of glycidyl methacrylate, 5 parts of acrylic acid and 10 parts of azobisisobutylonitrile was added dropwise over 3 hours. Then, a mixture of 100 parts of xylol and 2.5 parts of azobisisobutylonitrile was added dropwise over 1 hour. Thereafter, the reaction product was matured at 120° C. for 1 hour. After the maturing, 0.1 part of p-tert. butylcatechol, 10 parts of acrylic acid and 1.0 part of dimethylaminoethanol were incorporated to carry out a reaction under heat at 120° C. for 3.5 hours. As a result, a clear varnish (dispersion stabilizer [C]) having a solid content of 50% and a Gardner viscosity of J was obtained. The resultant resin had a number average molecular weight of about 9,000 and on the average about 1.0 polymeric unsaturated double bond per molecule.

PREPARATION EXAMPLE 4

200 parts of toluene and 200 parts of heptane were charged into the same reactor that was used in Preparation Example 1, and the mixture was heated to 100° C. While this temperature was maintained, a mixture of 150 parts of 2-ethylhexyl methacrylate, 90 parts of lauryl methacrylate, 150 parts of n-butyl methacrylate, 80 parts of gamma-methacryloxypropyltrimethoxysilane, 10 parts of hydroxyethyl acrylate and 10 parts of azobisiso-butylonitrile was added dropwise over 3 hours.

Then, 100 parts of toluene and 2.5 parts of azobisisobutylonitrile were added dropwise over 1 hour. Further, the reaction product was matured for one hour.

After the maturing, 0.1 part of p-tert. butylcatechol and 20.0 parts of isocyanateethyl methacrylate were added, and the mixture was heated at 90° C. for 2 hours to give a clear varnish (dispersion stabilizer [D] liquid) having a Gardner viscosity of F and a solid content of 50%. The resultant resin has a number average molecular weight of about 9,000 and on t he average about 1.0 polymeric unsaturated double bond per molecule.

EXAMPLE 1

186 parts of xylene, 900 parts of heptane and 772 parts of the 50% dispersion stabilizer [A] liquid were charged into a reactor having a stirrer, reflux condenser and thermometer, and the mixture was heated to 70° C. Then, while this temperature was maintained, a mixture of 135 parts of isocyanateethyl methacrylate, 495 parts of methyl methacrylate, 135 parts of acrylonitrile, 135 parts of styrene, 13.5 parts of azobis alpha,gamma-dimethylvaleronitrile and 100 parts of heptane was added dropwise over 4 hours to carry out a polymerization. After the addition, the reaction product was matured for 30 minutes, and then a mixture of 100 parts of xylene and 45 parts of azobis alpha,gamma-dimethylvaleronitrile was added dropwise over 1 hour. Thereafter, the reaction product was matured for 1 hour to give a milk-white dispersion having a solid content of 45% and a Gardner viscosity of B. Dispersed particles of the resultant dispersion had an average particle diameter of about 300 nm. Measurement of the isocyanate value of the dispersion by back titration method using butylamine and hydrochloric acid showed 27.0. Thus, it was found that the dispersion contained more than 95% of the 28.4 theoretical value. The dispersion was stored at room temperature for 6 months to show no thickening and sedimentation. However, when 100 parts of acetone was mixed with 100 parts of the dispersion and the mixture was closed, the mixture as a whole gelled after about 6 hours.

Cyclohexanone 50PHR was added to the dispersion so obtained, the resultant dispersion was applied onto a tin plate, and the coating was dried at 50° C. for 30 minutes to form a clear crosslinked coating having a gel ratio (acetone extraction) of about 91%.

EXAMPLE 2

By replacing the 50% dispersion stabilizer [A] liquid by the 50% dispersion stabilizer [B] liquid obtained in Preparation Example 2 and replacing isocyanateethyl mthacrylate by hydroxyethyl acrylate in Example 1, Example 1 was repeated to give a milk-white dispersion having a solid content of 45% and a Gardner viscosity of B. The dispersed particles in the resultant dispersion had an average diamter of 300 nm. The measured isocyanate value of the resultant dispersion was 20.5, which is 97.6% of the theoretical value. Methyl ethyl ketone 50PHR was added to the resultant dispersion, and the mixture was closed to show no thickening and sedimentation during 3 months. After the storage for 6 months, its viscosity was thickened to F.

The above dispersion was applied onto a tin plate and the tin plate was left to stand at room temperature for 7 days to form a clear flexible coating having a gel ratio of about 83%.

EXAMPLE 3

Example 1 was repeated except that the polymerization temperature was changed to 90° C., the 50% dispersion stabilizer [A] liquid was changed to the 50% dispersion stabilizer [C] liquid obtained in Preparation Example 3, and further, isocyanateethyl methacrylate was changed to acrylic acid. As a result, a milk-white dispersion having a solid content of 45% and a Gardner viscosity of C was obtained. The dispersed particles of the resultant dispersion had an average particle diameter of 350 nm. The acid value of the resultant dispersion resin was 116.0, which is 99.4% of the theoretical value, i.e., the epoxy groups in the dispersion stabilizer and the carboxyl groups in the polymer particles scarecely reacted during the polymerization.

Carbitol acetate 100PHR and coconutamine 1PHR were added to the above dispersion, and the mixture was stored at room temperature. No change was found in its viscosity for 6 months.

Further, this system was applied onto a tin plate and the plate was heated at 140° C. for 1 hour to show a gel ratio of about 80%. Coconutamine 1PHR and carbitol acetate 500PHR were added to the above dispersion, and the resultant dispersion was stored at room temperature. About 2 months later, the dispersion came to a pudding-like gelation.

EXAMPLE 4

772 parts of the 50% dispersion stabilizer [D] liquid obtained in Preparation Example 4, 186 parts of toluene and 900 parts of heptane were charged to the same reactor that was used in Example 1, and the mixture was heated to 70° C. While this temperature was maintained, a mixture of 45 parts of acrylic acid, 495 parts of methyl methacrylate, 90 parts of acrylonitrile, 90 parts of styrene, 180 parts of hydroxyethyl methacrylate, 13.5 parts of azobis alpha,gamma-dimethylvaleronitrile and 100 parts of heptane was added dropwise over 4 hours to carry out a polymerization.

After the addition, the reaction product was matured for 30 minutes, and then a mixture of 100 parts of toluene and 45 parts of azobis alpha,gamma-dimethylvaleronitrile was added dropwise over 1 hour, and thereafter, the reaction product was matured for 1 hour to give a dispersion.

The resultant dispersion was a milk-white one having a solid content of 45% and a Gardner viscosity of B. This dispersion had an average particle diameter of about 300 nm, and its stabilities such as sedimentation property, etc., were good. Carbitol acetate 65PHR was added the dispersion and the resultant dispersion was stored at room temperature for 3 months to show no thickening and gelation. The above dispersion was applied onto a tin plate to a cating thickness of about 50μm, and the coating was dired at 60° C. for 30 minutes to form a clear crosslinked coating having a gel ratio of about 80%.

COMPARATIVE EXAMPLE 1

Example 1 was repeated except that 400 parts of heptane and 500 parts of methyl ethyl ketone were used in place of 900 parts of heptane. During the polymerization, the system went to gelation.

COMPARATIVE EXAMPLE 2

Example 2 was repeated except that 400 parts of heptane and 500 parts of cellosolve acetate were used in place of 900 parts of heptane. During the polymerization, the system went to gelation.

COMPARATIVE EXAMPLE 3

Example 3 was repeated except that 400 parts of mineral spirit and 500 parts of cyclohexanone were used in place of 900 parts of heptane. During the polymerization, the system went to gelation.

COMPARATIVE EXAMPLE 4

Example 4 was repeated except that 300 parts of heptane and 600 parts of cellosolve were used in place of 900 parts of heptane. During the polymerization, the system went to gelation.

What we claim is:

1. A dispersion of reactive polymer particles obtained by polymerization of a monomer in an organic liquid which dissolves the monomer but does not dissolve a polymer formed from the monomer, in the presence of a dispersion stabilizer composed of a high molecular weight polymer; wherein
    (i) said dispersion stabilizer is a high molecular weight polymer which is obtained by polymerization of an ethylenically unsaturated monomer and soluble in the above organic liquid and which contains a chemically reactive group (A);
    (ii) said polymer particles are particles of a high molecular weight polymer which are obtained by polymerization of an ethylenically unsaturated monomer and contain a complementary chemically reactive group (B) capable of mutually reacting with the chemically reactive group (A);
    (iii) the chemically reactive group (A) and the chemically reactive group (B) are present stably in the dispersion;
    (iv) the difference of solubility parameter (SP value) between the polymer particles and the dispersion stabilizer is at least 0.2;
    (v) the organic liquid has a solubility parameter (SP value) of not more than 9.3;
    (vi) the dispersion stabilizer has a solubility parameter (SP value) of not more than 9.3;
    (vii) the polymer particles have a solubility parameter (SP value) of not less than 9;
    (viii) the difference of solubility parameter (SP value) between the polymer particles and the dispersion stabilizer is at least 0.2;
    (ix) the dispersion stabilizer has on the average 5 to 50 chemically reactive groups (A) in one molecule thereof;
    (x) the polymer particles have the chemically reactive group (B) in an amount 0.3 to 3 times more than the amount of the chemically reactive group (A) in the dispersion stabilizer and
    (xi) reactive group (A) is only present in the dispersion stabilizer and reactive group (B) is only present in the polymer particles.

2. The dispersion according to claim 1 wherein the organic liquid has a solubility parameter (SP value) of not more than 8.5.

3. The dispersion according to claim 1 wherein the organic liquid is aliphatic, alicyclic or aromatic hydrocarbon.

4. The dispersion according to claim 1 wherein the dispersion stabilizer is of vinyl-type or acryl-type resin.

5. The dispersion according to claim 1 wherein the dispersion stabilizer has a number average molecular weight of 1,000 to 50,000.

6. The dispersion according to claim 1 wherein the polymer particles are of vinyl-type or acryl-type resin.

7. The dispersion according to claim 1 wherein the polymer particles have the chemically reactive group (B) in an amount nearly equal to the amount of the chemically reactive group (A) in the dispersion stabilizer.

8. The dispersion of reactive polymer particles according to claim 1 wherein the combination of the chemically reactive group (A) and the chemically reactive group (B) is a combination of epoxy group and carboxyl group, a combination of hydroxyl group and isocyanate group or a combination of alkoxysilane group and hydroxyl group.

9. The dispersion according to claim 1 wherein the dispersion stabilizer has a glass transition point in the range of from $-20°$ C. to $60°$ C.

10. The dispersion according to claim 1 wherein the polymer particles have a glass transition point in the range of from $10°$ C. to $100°$ C.

11. The dispersion according to claim 1 wherein the dispersion stabilizer/polymer particles weight ratio is in the range of from 5/95 to 70/30.

12. The dispersion according to claim 1 which further contains a particle-coalescing solvent.

13. The dispersion according to claim 12 wherein the particle-coalescing solvent has a boiling point which is higher than that of the organic liquid by at least $10°$ C.

14. A coating composition containing the dispersion of claim 1.

* * * * *